(12) United States Patent
Tang et al.

(10) Patent No.: US 11,779,909 B2
(45) Date of Patent: Oct. 10, 2023

(54) HYDROCRACKING CATALYST, PREPARATION METHOD THEREFOR AND APPLICATION THEREOF

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Zhaoji Tang, Liaoning (CN); Yanze Du, Liaoning (CN); Hongfei Fan, Liaoning (CN); Jifeng Wang, Liaoning (CN); Zhengmin Yu, Liaoning (CN); Xiaoyan Sun, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

( * ) Notice: Subject to any disclaimer, the term of this patent is extended or adjusted under 35 U.S.C. 154(b) by 203 days.

(21) Appl. No.: 17/312,923

(22) PCT Filed: Dec. 12, 2019

(86) PCT No.: PCT/CN2019/124803
§ 371 (c)(1),
(2) Date: Jun. 10, 2021

(87) PCT Pub. No.: WO2020/119754
PCT Pub. Date: Jun. 18, 2020

(65) Prior Publication Data
US 2022/0062878 A1  Mar. 3, 2022

(30) Foreign Application Priority Data

Dec. 13, 2018 (CN) .......................... 201811521961.1
Dec. 13, 2018 (CN) .......................... 201811522285.X

(51) Int. Cl.
| | | |
|---|---|---|
| *C10G 47/16* | (2006.01) | |
| *B01J 29/85* | (2006.01) | |
| *B01J 6/00* | (2006.01) | |
| *B01J 21/08* | (2006.01) | |
| *B01J 35/10* | (2006.01) | |
| *C10G 47/20* | (2006.01) | |

(Continued)

(52) U.S. Cl.
CPC .............. *B01J 29/85* (2013.01); *B01J 6/001* (2013.01); *B01J 21/08* (2013.01); *B01J 29/14* (2013.01); *B01J 29/146* (2013.01); *B01J 35/0006* (2013.01); *B01J 35/1019* (2013.01); *B01J 35/1023* (2013.01); *B01J 35/1038* (2013.01); *B01J 35/1042* (2013.01); *B01J 35/1061* (2013.01); *B01J 37/0009* (2013.01); *B01J 37/0201* (2013.01); *B01J 37/0203* (2013.01); *B01J 37/0205* (2013.01); *C10G 47/10* (2013.01); *C10G 47/16* (2013.01); *C10G 47/20* (2013.01); *B01J 2229/186* (2013.01); *B01J 2229/20* (2013.01); *B01J 2229/42* (2013.01)

(58) Field of Classification Search
CPC ... B01J 6/001; B01J 21/08; B01J 29/85; B01J 29/005; B01J 29/14; B01J 29/16; B01J 29/166; B01J 29/146; B01J 2229/42; B01J 2229/20; B01J 2229/186; B01J 35/0006; B01J 35/1023; B01J 35/1019; B01J 35/1038; B01J 35/1042; B01J 35/1061; B01J 37/0009; B01J 37/0201; B01J 37/0203; B01J 37/0205; C10G 47/20; C10G 47/10; C10G 47/16
USPC ........ 502/60, 62, 63, 64, 66, 67, 69, 79, 74; 208/108, 109, 110, 111.01, 111.3, 111.35
See application file for complete search history.

(56) References Cited

U.S. PATENT DOCUMENTS

| | | |
|---|---|---|
| 4,440,871 A | 4/1984 | Lok et al. |
| 5,565,088 A | 10/1996 | Nair et al. |

(Continued)

FOREIGN PATENT DOCUMENTS

| | | |
|---|---|---|
| CN | 85109634 A | 6/1986 |
| CN | 1488726 A | 4/2004 |

(Continued)

OTHER PUBLICATIONS

Hua, Derun et al., "Synthesis and characterization of tungsten-incorporated mesoporous molecular sieve MCM-48 by one step", Journal of Porous Materials, vol. 18, 729-734 (2011), Nov. 30, 2010, DOI:10.1007/s10934-010-9434-9.

(Continued)

*Primary Examiner* — Elizabeth D Wood
(74) *Attorney, Agent, or Firm* — NKL Law; Allen Xue

(57) ABSTRACT

Disclosed is a hydrocracking catalyst, a preparation method and an application thereof. The catalyst comprises a carrier, silicon dioxide and active ingredients loaded on the carrier, wherein the carrier comprises Y molecular sieves and SAPO-34 molecular sieves. The preparation method of the hydrocracking catalyst comprises the following steps: (1) mixing materials comprising Y molecular sieves and SAPO-34 molecular sieves, and then subjecting the mixture to molding, drying and calcinating to obtain a carrier; (2) introducing silane and the active ingredients into the carrier prepared in the step (1), subsequently performing the drying and calcinating to prepare the hydrocracking catalyst. The catalyst prepared with the method can be used for hydrocracking reaction, thereby significantly increase yield of jet fuel.

20 Claims, No Drawings

(51) Int. Cl.
  *B01J 35/00* (2006.01)
  *B01J 29/14* (2006.01)
  *B01J 37/00* (2006.01)
  *C10G 47/10* (2006.01)
  *B01J 37/02* (2006.01)

(56) References Cited

U.S. PATENT DOCUMENTS

| | | |
|---|---|---|
| 5,610,112 A | 3/1997 | Lago |
| 5,972,205 A | 10/1999 | Tsang et al. |
| 6,043,178 A | 3/2000 | Ge et al. |

FOREIGN PATENT DOCUMENTS

| | | |
|---|---|---|
| CN | 1261542 C | 6/2006 |
| CN | 101035618 A | 9/2007 |
| CN | 101269343 A | 9/2008 |
| CN | 101450320 A | 6/2009 |
| CN | 101618348 A | 1/2010 |
| CN | 102441427 A | 5/2012 |
| CN | 102451752 A | 5/2012 |
| CN | 103100399 A | 5/2013 |
| CN | 103447075 A | 12/2013 |
| CN | 103785446 A | 5/2014 |
| CN | 103801384 B | 7/2015 |
| CN | 105618117 A | 6/2016 |
| CN | 106853377 A | 6/2017 |
| CN | 107344721 A | 11/2017 |
| CN | 107442129 A | 12/2017 |
| EP | 1523535 A1 | 4/2005 |
| JP | 2002542929 A | 12/2002 |
| JP | 2010510060 A | 4/2010 |
| JP | 2009545441 A | 12/2019 |
| RU | 2124944 C1 | 1/1999 |
| RU | 2366505 C2 | 9/2009 |
| WO | 8603694 A1 | 7/1986 |

OTHER PUBLICATIONS

Li, Tao et al.; "Hydrocracking of palm oil to jet biofuel over different zeolites"; International Journal of Hydrogen Energy; vol. 41, No. 47; Dec. 21, 2016; pp. 21883-21887, DOI: 10.1016/J.I JHYDENE.2016.09.013.

Kolesnikov, I.M.; "Catalysis in the gas and oil industry"; Ministry of Education and Science Russian State University of Oil and Gas; 2012; pp. 116.

G.M. Panchenkov; Chemical kinetics and catalysis; Moscow University Press, 1961; pp. 309.

HYDROCRACKING CATALYST, PREPARATION METHOD THEREFOR AND APPLICATION THEREOF

FIELD

The present disclosure relates to a hydrocracking catalyst, a preparation method and an application thereof, in particular to a hydrocracking catalyst capable of increasing jet fuel yield and a preparation method of the hydrocracking catalyst and an application of the hydrocracking catalyst.

BACKGROUND

The continuously increasing demand of the international refined oil product market for middle distillate have caused an increased amount of middle distillate, especially aviation kerosene, is required to be derived from heavy distillate, and the hydrocracking process is one of the important means for lightening the heavy oil. The hydrocracking process has the characteristics such as strong adaptability of raw materials, excellent product quality, strong flexibility in adjustments, high yield of middle distillate, flexible product structure, thus the hydrocracking technology has become increasingly important, particularly in view of solving the problems that the People's Republic of China (PRC) currently confronts, such as petroleum resource shortage, gradually stringent environmental protection requirements, and the petroleum product structure cannot meet market requirements; as a result, the hydrocracking technology will emerge as one of effective measures for improving quality of the petroleum products, reducing environmental pollution and enhancing resilience to the market changes, and the hydrocracking facility has become the most important processing equipment of modern refineries. The aforementioned factors have promoted the rapid development of selective hydrocracking technology targeting at the petroleum products with high and medium boiling points, and the hydrocracking catalyst is the key of the technology development.

The hydrocracking catalyst comprises two parts, namely a carrier and active ingredients, wherein the carrier mainly serves to provide a place for dispersing the metal active ingredients, and the carrier per se provides the suitable acidity in the catalytic reaction process, so that the carrier and the active ingredient jointly accomplish the whole reaction. The hydrocracking catalyst is a bi-functional catalyst comprising an acidic component and a hydrogenation component, wherein the hydrogenation component is a metal oxide selected from the VIII groups and VIB groups in the Periodic Table, and the acidic component is mainly consisting of molecular sieves and an inorganic oxide. At present, the carrier of hydrocracking catalyst is composed of molecular sieves, amorphous silica-alumina, and alumina.

The high dispersion of the active ingredients of the hydrocracking catalyst, the weak Van Der Waals force between the active metal and the carrier, and a use of the molecular sieves having excellent performance as the carrier, the factors can effectively improve reaction activity of the catalyst and yield of target products. High activity, strong stability, excellent selectivity, low cost, and no pollution during the preparation process have always been the bottleneck to be overcome for the development of catalysts in the technical field. The industrial use of the catalysts having the above characteristics not only can produce more target products, but also allow the reaction to be carried out under the relatively moderate conditions, so as to extend the operation cycle and reduce the production costs.

CN200810012212.6 discloses a hydrocracking catalyst carrier and a preparation method thereof. In the carrier, the modified Y molecular sieve has high crystallinity, large silicon-aluminum ratio and proper total acidity and acid distribution, and can form an acid component with the amorphous silica-alumina. Therefore, the carrier is particularly suitable for serving as a hydrocracking catalyst carrier. The catalyst prepared with the carrier has improved nitrogen resistance, but the activity of the catalyst is poor, and cannot meet the industrial requirements in a certain extent.

CN201410603837.5 discloses a method for preparing hydrocracking catalyst, the method comprises the following steps: uniformly mixing the modified Y molecular sieves, amorphous silicon-aluminum and/or alumina according to a certain proportioning ratio, adding dilute nitric acid into the mixture so as to carry out pulping, then carrying out strip-extruding forming, drying and roasting to obtain a silicon-alumina carrier containing the modified Y molecular sieve, then dipping the silica-alumina carrier by active ingredients, and carrying out drying and roasting, so as to obtain the hydrocracking catalyst.

CN85109634A discloses a method for processing a crude oil feedstock in the presence of hydrogen, the method comprises the steps of contacting the feedstock oil feedstock and hydrogen under effective process conditions with a conversion catalyst comprising an effective amount of at least one hydrogenation catalyst and an effective amount of at least one silicoaluminophosphate (SAPO) of the U.S. Pat. No. 4,440,871, the silicoaluminophosphate is characterized in that its calcined form adsorbs oxygen of at least 4 percent by weight at a partial pressure of 100 torr and a temperature of −186° C. The method uses a specific silicoaluminophosphate (SAPO) which can obviously increase the ratio of isoparaffins to normal paraffins of the gasoline fraction.

The existing hydrocracking catalysts used in the hydrocracking reaction process need further improvement in the aspects of the reaction activity, selectivity matching of the middle distillate, and the production of high-quality products, in particular, the improvement of increasing yield of the jet fuel yield in the hydrocracking product.

SUMMARY

The present disclosure aims to solve the problems in the prior art, and provides a hydrocracking catalyst, and a preparation method thereof and a use thereof. The catalyst is used for hydrocracking reaction, such that the jet fuel yield is significantly increased.

In one aspect, the present disclosure provides a hydrocracking catalyst comprising a carrier, silica and active ingredients loaded on the carrier, wherein the carrier comprises Y molecular sieves and SAPO-34 molecular sieves, and based on the weight of the carrier, the content of Y molecular sieves is within a range of 2-35 wt %, preferably 8-25 wt %, further preferably 10-20 wt %, and the content of SAPO-34 molecular sieves is within a range of 2-25 wt %, preferably 2-8 wt %, further preferably 2.5-6 wt %; the active ingredients comprise VIB group metal and/or VIII group metal, the VIB group metal is molybdenum (Mo) and/or tungsten (W), the VIII group metal is cobalt (Co) and/or nickel (Ni); based on the weight of the catalyst, the content of silica loaded on the carrier is within a range of 0.5-5 wt %, preferably 1-4 wt %, further preferably 1.5-3 wt %; the content of the VIB group metal in terms of oxide is within a range of 10-25 wt %, preferably 15-20 wt %; and the content of the VIII group metal in terms of oxide is within a range of 4-10 wt %, preferably 5-8 wt %.

In another aspect, the present disclosure provides a method for preparing a hydrocracking catalyst, the method comprising the following steps:

(1) subjecting the materials comprising Y molecular sieves and SAPO-34 molecular sieves to molding, drying and calcinating to obtain a carrier;

(2) introducing silane and active ingredients into the carrier prepared in the step (1), wherein the active ingredients comprise VIB group metal element and/or VIII group metal element, and then carrying out drying and calcinating.

The hydrocracking catalyst carrier of the present disclosure comprises Y molecular sieves and SAPO-34 molecular sieves, and silica formed by calcinating silane is introduced into the carrier, such that the Y molecular sieves and the SAPO-34 molecular sieves are coordinated on acidity and pore structure, the respective performance and characteristics of the Y molecular sieves and the SAPO-34 molecular sieves are fully exerted, and the two kinds of molecular sieves can generate desirable synergy in terms of the catalytic action, so that the catalyst prepared with the hydrocracking catalyst carrier can significantly increase the yield of j et fuel to about 40% from about 30% of the conventional yield, and the production of high-quality hydrocracking tail oil can be taken into consideration.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

According to the present disclosure, the carrier of the catalyst comprises Y molecular sieves and SAPO-34 molecular sieves, after calcinating the carrier impregnated with silane, the silica is generated in situ from silane and loaded on the carrier, the silica and the active ingredients are jointly distributed on the outer surface and the inner surface of a pore channel of the carrier.

Preferably, the Y molecular sieves in the above catalyst have the following properties: the molar ratio of $SiO_2/Al_2O_3$ is within a range of 25-150, the specific surface area is within a range of 550-1,000 $m^2/g$, and the total pore volume is within a range of 0.30-0.60 mL/g.

According to a preferable embodiment of the present disclosure, the SAPO-34 molecular sieves in the catalyst have a molar ratio of $SiO_2/Al_2O_3$ within a range of 0.05-0.5, a specific surface area within a range of 200-800 $m^2/g$, and a total pore volume within a range of 0.30-0.60 mL/g.

According to a preferred embodiment of the present disclosure, the catalyst further comprises phosphorus (P), the content of P in terms of oxide is within a range of 1.2-1.6 wt %, based on the total amount of the catalyst. Such that the hydrocracking effect and the jet fuel yield can be further improved. The reason may reside in an existence of phosphorus, especially the introduction of phosphorus into the impregnation liquid, causes the impregnation liquid to become a stable phosphomolybdic heteropoly acid system, and the active ingredients are uniformly dispersed on the carrier surface to form more active centers for reaction.

According to a preferred embodiment of the present disclosure, in regard to the shaped catalyst, the carrier further comprises a binder, such as one or more selected from the group consisting of alumina, amorphous silica-alumina and silica, and the content of the binder in the carrier is within a range of 15-85 wt %, preferably 25-80 wt %, and more preferably 30-50 wt %, based on the weight of the carrier.

According to a preferred embodiment of the present disclosure, the hydrocracking catalyst among the above-mentioned catalysts has the following properties: the specific surface area is within a range of 120-500 $m^2/g$, preferably 170-300 $m^2/g$, and more preferably 180-200 $m^2/g$; the pore volume is within a range of 0.30-0.65 mL/g, preferably 0.35-0.60 mL/g, and more preferably 0.35-0.4 mL/g; the pore volume of the pore diameter of 4-10 nm accounts for 65-95%, preferably 70-90%, more preferably 75-85% of the total pore volume.

In the present disclosure, unless otherwise specified, the molar ratio of $SiO_2/Al_2O_3$ is measured with chemical analysis using the ZSX100e type Wavelength Dispersive X-ray Fluorescence Spectrometer (XRF) manufactured by the Rigaku Corporation in Japan.

The specific surface area, the pore volume and the pore distribution are measured by a low-temperature liquid nitrogen physical adsorption method according to the National Standard GB/T-19587-A2004 of China, and using a low-temperature nitrogen adsorption instrument with ASAP2420 model of Micromeritics Corporation in the United States of America (USA).

In the present disclosure, the composition of the catalyst is obtained by calculation according to the feeding amount.

According to the preparation method of the hydrocracking catalyst provided by the present disclosure, the method comprises the following steps:

(1) subjecting the materials comprising Y molecular sieves and SAPO-34 molecular sieves to molding, drying and calcinating to obtain a carrier;

(2) introducing silane and active ingredients into the carrier prepared in the step (1), wherein the active ingredients comprise VIB group metal and/or VIII group metal, and then carrying out drying and calcinating.

It is preferable that the materials in the step (1) further comprise a binder or a precursor thereof, or the binder or the precursor thereof is added during the molding process.

According to a preferred embodiment of the present disclosure, in the step (1) of the aforementioned method, the materials further comprise microcrystalline cellulose. Preferably, the content of the microcrystalline cellulose in the materials is within a range of 0.2-6 wt %, preferably 0.5-4 wt %. The inclusion of microcrystalline cellulose can improve the pore structure of the carrier, such that the catalyst containing the carrier can further improve the yield of jet fuel. The present disclosure does not impose special requirement on the physical properties of microcrystalline cellulose, all kinds of commercially available microcrystalline cellulose can be used in the present disclosure.

According to a preferred embodiment of the present disclosure, in the step (1) of the aforementioned method, the drying conditions are as follows: the drying temperature is within a range of 60-180° C., preferably 90-120° C.; the drying time is within a range of 0.5-20.0 hours, preferably 3.0-6.0 hours; the calcinating conditions are as follows: the calcinating temperature is within a range of 350-750° C., preferably 500-650° C.; the calcinating time is within a range of 0.5-20.0 hours, preferably 3.0-6.0 hours. The shape of the carrier can be molded as required, such as a dentate sphere, a three-leaf clover shape, a four-leaf clover shape, a cylindrical strip shape, or other suitable shape. The calcinating is performed in an oxygen-containing atmosphere, and the oxygen concentration is not particularly limited, and may be a pure oxygen atmosphere, an air atmosphere, or the like. The drying may be performed in an air atmosphere, or an inert atmosphere such as a nitrogen atmosphere.

In the present disclosure, the silane is used for subsequently forming silica by calcinating, and is attached to the outer surface of the carrier and the inner surface of the pore passage, thus the silane may be an organosilicon compound which meets the above conditions. Preferably, the silane in step (2) of the aforementioned method is one or more selected from the group consisting of aminosilane, alkylsilane, sulfur-containing silane, and siloxane. The aminosilane refers to an organic compound which contains amino group and silicon atoms in the molecule and only contains five elements N, H, Si, 0 and C, the amino group may be one or more selected from the group consisting of a primary amine group, a secondary amine group and a tertiary amine group, the number of the amino group may be one or more; it is preferable that the number of carbon atoms of the aminosilane is not more than 9 or the molecular weight is not more than 230, for example, the aminosilane may be one or more selected from the group consisting of 3-aminopropyltrimethoxysilane, aminopropylmethyldiethoxysilane, N-aminoethyl-3-aminopropylmethyldimethoxysilane, N-(β-aminoethyl)-γ-aminopropyltrimethoxysilane, γ-diethylenetriaminepropylmethyldimethoxysilane, and N-aminoethyl-3-aminopropylmethyldimethoxysilane or a combination thereof. The alkylsilane refers to an organic compound containing only four elements H, Si, O and C in a molecule, preferably the alkylsilane has not more than 19 carbon atoms, and may be, for example, one or more selected from the group consisting of diphenyldimethoxysilane, isobutyltriethoxysilane, isobutyltrimethoxysilane, dimethyldimethoxysilane, methyltriacetoxysilane, dodecyltriethoxysilane and hexadecyltrimethoxysilane or a combination thereof. The sulfur-containing silane refers to an organic compound containing only five elements S, H, Si, 0 and C in a molecule, preferably the carbon atom number of the sulfur-containing silane is not more than 18, and for example, the sulfur-containing silane may be one or more selected from the group consisting of bis-[3-(triethoxy silicon)propyl]-tetrasulfide, mercaptopropyl trimethoxy silane and 3-mercaptopropyl triethoxy silane or a combination thereof. The siloxane refers to a polymer having a main chain of Si—O—Si and the repeating units of $R_2SiO$, wherein R may be various alkyl groups with 1-4 carbon atoms.

In step (2) of the aforementioned method, the silane or active ingredient is introduced into the carrier by means of impregnation method, which is either an incipient-wetness impregnation method, or an excess impregnation; either a stepwise impregnation or a co-impregnation, preferably an equal volume impregnation. The impregnation methods are well known among those skilled in the art.

The active ingredients are preferably water-soluble salts of the respective active ingredients, such as chlorides and/or nitrates.

According to a preferred embodiment of the present disclosure, the method further comprises loading phosphorus onto the carrier obtained in step (1). The impregnation of the phosphorus onto the carrier can be carried out simultaneously with the active ingredients and the silane or in stages, preferably simultaneously. It is preferable that the phosphoric acid is used for providing phosphorus.

The final product catalyst is prepared by impregnating the carrier with a solution containing silane or active ingredients, and carrying out drying and calcinating. The drying conditions are conventional, the drying temperature is within a range of 60-200° C., preferably 90-130° C., and the drying time is within a range of 0.5-20 hours, preferably 1-6 hours. The calcinating temperature is within a range of 300-500° C., preferably 380-450° C., and the calcinating time is within a range of 0.5-hours, preferably 1-6 hours.

In the step (2) of the above-mentioned method, the active ingredients and the silane may be introduced simultaneously or separately, preferably simultaneously; when the active ingredients and the silane are introduced simultaneously, the molar ratio of the silane to the VIB group metal in the impregnation liquid is 0.01:1-10:1, preferably 0.01:1-5:1.

According to the method, silane is impregnated on the carrier with a loading mode similar to that of the active ingredients, and then subjecting the carrier to calcinating, such that silica is generated in situ and loaded on the carrier, the silica and the active ingredients are jointly distributed on the outer surface of the carrier and the inner surface of a pore channel, thereby significantly increase the yield of jet fuel in the hydrocracking product.

The solvent in the impregnation liquid is preferably water, further preferably, the impregnation liquid comprises one or more selected from the group of glycerol, N,N-dimethylformamide, acetone, dimethyl sulfoxide, ethanolamine, diethanolamine, triethanolamine and ammonium citrate; the molar ratio of one or more selected from the group of glycerol, N,N-dimethylformamide, acetone, dimethyl sulfoxide, ethanolamine, diethanolamine, triethanolamine and ammonium citrate to the VIII group metal is preferably within a range of 0.01:1-8:1, and preferably 0.01:1-4:1.

The hydrocracking catalyst of the present disclosure is applicable to the hydrocracking process for producing jet fuel, the operating conditions are as follows: the reaction temperature is within a range of 340-430° C., preferably 355-385° C.; the hydrogen partial pressure is within a range of 5-20 MPa, preferably 8-15 MPa; the hydrogen-oil volume ratio is within a range of 500-2000:1, preferably 750-1500:1; and the liquid hourly space velocity is within a range of 0.5-1.8 $h^{-1}$, preferably 0.7-1.5 $h^{-1}$.

The hydrocracking catalyst of the present disclosure is suitable for processing heavy feedstock oil, which including one or more selected from the group consisting of reduced pressure distillate oil, coking gas oil, catalytic cracking gas oil, catalytic cracking cycle oil or a combination thereof. Preferably, the heavy feedstock oil is hydrocarbons with a boiling point of 300-600° C., and the nitrogen content is generally within a range of 50-2,800 mg/g.

In order to better illustrate the present disclosure, the functions and effects of the present disclosure will be further described below with reference to examples and comparative examples, but the scope of the present disclosure is not limited to these examples. In the following examples and comparative examples, unless otherwise specified, % represents % by mass, the alumina represents γ-alumina. The molar ratio of $SiO_2/Al_2O_3$ is measured with chemical analysis using the ZSX100e type Wavelength Dispersive X-ray Fluorescence Spectrometer (XRF) manufactured by the Rigaku Corporation in Japan; the specific surface area, the pore volume and the pore distribution are measured by a low-temperature liquid nitrogen physical adsorption method according to the National Standard GB/T-19587-A2004 of China, and using a low-temperature nitrogen adsorption instrument with ASAP2420 model of Micromeritics Corporation in the United States of America (USA); the composition of the catalyst is obtained by calculation according to the feeding amount.

Example 1

(1) Preparation of the Hydrocracking Catalyst Carrier 20 g of Y molecular sieves (the molar ratio of $SiO_2/Al_2O_3$ was 85, the specific surface area was 756 m$^2$/g, the total pore volume was 0.38 mL/g) and 8 g of SAPO-34 molecular sieves (the molar ratio of $SiO_2/Al_2O_3$ was 0.25, the specific surface area was 728 m$^2$/g, the total pore volume was 0.32 mL/g), 80 g of alumina and 4.2 g of microcrystalline cellulose were added into a rolling machine for carrying out rolling compaction, after the dry mixing was performed for 5 minutes, 85 g of aqueous solution containing 3.85 g of nitric acid was added, the mixture was subjected to rolling compaction for 20 minutes, and rolled into a paste, the strip-extruding was carried out, and the extruded strips were subjected to drying at 120° C. for 3 hours and calcinating at 500° C. for 3 hours to obtain a carrier Z1.

(2) Preparation of the Catalyst

The carrier Z1 was impregnated in an incipient-wetness impregnation method with an impregnation liquid containing Mo, Ni, P, bis[3-(triethoxysilyl)propyl]-tetrasulfide (CAS #: 40372-72-3), N,N-dimethylformamide and water, wherein the molar ratio of the bis-[3-(triethoxysilyl)propyl]-tetrasulfide to the Mo contained in the final catalyst was 0.05:1, the molar ratio of the N,N-dimethylformamide to the Ni contained in the final catalyst was 0.04:1, the impregnated carrier was subjected to drying at 120° C. for 3 hours, and calcinating at 390° C. for 2 hours, the finally prepared catalyst was labeled as C-1, the properties of the catalyst were shown in Table 1.

Example 2

(1) Preparation of the Hydrocracking Catalyst Carrier 25 g of Y molecular sieves (the molar ratio of $SiO_2/Al_2O_3$ was 65, the specific surface area was 750 m$^2$/g, the total pore volume was 0.48 mL/g) and 6 g of SAPO-34 molecular sieves (the molar ratio of $SiO_2/Al_2O_3$ was 0.05, the specific surface area was 550 m$^2$/g, the total pore volume was 0.35 mL/g), 70 g of silica and 2.8 g of microcrystalline cellulose were added into a rolling machine for carrying out rolling compaction, after the dry mixing was performed for 6 minutes, 80 g of aqueous solution containing 3.54 g of nitric acid was added, the mixture was subjected to rolling compaction for 25 minutes, and rolled into a paste, the strip-extruding was carried out, and the extruded strips were subjected to drying at 120° C. for 3 hours and calcinating at 550° C. for 3 hours to obtain a carrier Z2.

(2) Preparation of the Catalyst

The carrier Z2 was impregnated in an incipient-wetness impregnation method with an impregnation liquid containing Mo, Ni, P, N-aminoethyl-3-aminopropylmethyldimethoxysilane (CAS #: 3069-29-2), glycerol and water, wherein the molar ratio of the N-aminoethyl-3-aminopropylmethyldimethoxysilane to the Mo contained in the final catalyst was 0.08:1, the molar ratio of the glycerol to the Ni contained in the final catalyst was 0.08:1, the impregnated carrier was subjected to drying at 120° C. for 3 hours, and calcinating at 410° C. for 2 hours, the finally prepared catalyst was labeled as C-2, the properties of the catalyst were shown in Table 1.

Example 3

(1) Preparation of the Hydrocracking Catalyst Carrier 25 g of Y molecular sieves (the molar ratio of $SiO_2/Al_2O_3$ was 150, the specific surface area was 1,000 m$^2$/g, the total pore volume was 0.6 mL/g) and 7 g of SAPO-34 molecular sieves (the molar ratio of $SiO_2/Al_2O_3$ was 0.5, the specific surface area was 500 m$^2$/g, the total pore volume was 0.55 mL/g), 75 g of amorphous silica-alumina (the specific surface area was 425 m$^2$/g, and the pore volume was 1.2 mL/g), and 2.0 g of microcrystalline cellulose were added into a rolling machine for carrying out rolling compaction, after the dry mixing was performed for 5 minutes, 88 g of aqueous solution containing 9.5 g of acetic acid was added, the mixture was subjected to rolling compaction for 30 minutes, and rolled into a paste, the strip-extruding was carried out, and the extruded strips were subjected to drying at 120° C. for 3 hours and calcinating at 560° C. for 3 hours to obtain a carrier Z3.

(2) Preparation of the Catalyst

The carrier Z3 was impregnated in an incipient-wetness impregnation method with an impregnation liquid containing Mo, Ni, P, methyl triacetoxysilane (CAS #: 4253-34-3), dimethyl sulfoxide and water, wherein the molar ratio of the methyl triacetoxysilane to the Mo contained in the final catalyst was 0.08:1, the molar ratio of the dimethyl sulfoxide to the Ni contained in the final catalyst was 0.1:1, the impregnated carrier was subjected to drying at 120° C. for 3 hours, and calcinating at 380° C. for 2 hours, the finally prepared catalyst was labeled as C-3, the properties of the catalyst were shown in Table 1.

Example 4

(1) Preparation of the Hydrocracking Catalyst Carrier 26 g of Y molecular sieves (the molar ratio of $SiO_2/Al_2O_3$ was 60, the specific surface area was 750 m$^2$/g, the total pore volume was 0.52 mL/g) and 8 g of SAPO-34 molecular sieves (the molar ratio of $SiO_2/Al_2O_3$ was 0.08, the specific surface area was 685 m$^2$/g, the total pore volume was 0.38 mL/g), 75 g of alumina and 4.0 g of microcrystalline cellulose were added into a rolling machine for carrying out rolling compaction, after the dry mixing was performed for 5 minutes, 80 g of aqueous solution containing 10 g of acetic acid (with the concentration of 36 wt %) was added, the mixture was subjected to rolling compaction for 18 minutes, and rolled into a paste, the strip-extruding was carried out, and the extruded strips were subjected to drying at 110° C. for 3 hours and calcinating at 580° C. for 4 hours to obtain a carrier Z4.

(2) Preparation of the Catalyst

The carrier Z4 was impregnated in an equal volume with an impregnation liquid containing Mo, Ni, P, mercaptopropyl trimethoxy silane (CAS #: 4420-74-0), oxalic acid and water, wherein the molar ratio of the mercaptopropyl trimethoxy silane to the Mo contained in the final catalyst was 0.1:1, the molar ratio of the oxalic acid to the Ni contained in the final catalyst was 0.12:1, the impregnated carrier was subjected to drying at 120° C. for 3 hours, and calcinating at 440° C. for 2 hours, the finally prepared catalyst was labeled as C-4, the properties of the catalyst were shown in Table 1.

Example 5

(1) Preparation of the Hydrocracking Catalyst Carrier 25 g of Y molecular sieves (the molar ratio of $SiO_2/Al_2O_3$ was 62, the specific surface area was 746 m$^2$/g, the total pore volume was 0.53 mL/g) and 9 g of SAPO-34 molecular sieves (the molar ratio of $SiO_2/Al_2O_3$ was 0.07, the specific surface area was 722 m$^2$/g, the total pore volume was 0.51 mL/g), 86 g of alumina and 4 g of microcrystalline cellulose were added into a rolling machine for carrying out rolling compaction, after the dry mixing was performed for 6 minutes, 78 g of aqueous solution containing 5 g of acetic acid and 1.54 g of nitric acid was added, the mixture was subjected to rolling compaction for 20 minutes, and rolled into a paste, the strip-extruding was carried out, and the extruded strips were subjected to drying at 100° C. for 6 hours and calcinating at 600° C. for 3 hours to obtain a carrier Z5.

(2) Preparation of the Catalyst

The carrier Z5 was impregnated in an incipient-wetness impregnation method with an impregnation liquid containing Mo, Ni, P, dodecyl triethoxysilane (CAS #: 3069-21-4), diethanolamine and water, wherein the molar ratio of the dodecyl triethoxysilane to the Mo contained in the final catalyst was 0.2:1, the molar ratio of the diethanolamine to the Ni contained in the final catalyst was 0.2:1, the impregnated carrier was subjected to drying at 120° C. for 3 hours, and calcinating at 400° C. for 2 hours, the finally prepared catalyst was labeled as C-5, the properties of the catalyst were shown in Table 1.

Example 6

(1) Preparation of the Hydrocracking Catalyst Carrier

The preparation was carried out in the same manner as in the step (1) of the Example 5, except that the microcrystalline cellulose was not added, so as to obtain a carrier Z6.

(2) Preparation of the Catalyst

The preparation was performed in the same manner as in the step (2) of the Example 5, except that the carrier Z5 was replaced with the aforementioned carrier Z6, the finally prepared catalyst was labeled as C-6. The properties of the catalyst were shown in Table 1.

Example 7

(1) Preparation of the Hydrocracking Catalyst Carrier

The carrier was prepared with the same method as in the Example 5.

(2) Preparation of the Catalyst

The preparation was performed in the same manner as in the step (2) of the Example 5, except that impregnation liquid did not contain glycol amine, the finally prepared catalyst was labeled as C-7. The properties of the catalyst were shown in Table 1.

Comparative Example 1

(1) Preparation of the Hydrocracking Catalyst Carrier

The preparation was carried out in the same manner as in the step (1) of the Example 5, except that the microcrystalline cellulose was not added, so as to obtain a carrier DZ1.

(2) Preparation of the Catalyst

The preparation was performed in the same manner as in the step (2) of the Example 5, except that the carrier Z5 was replaced with the aforementioned carrier DZ1, and the impregnation liquid did not contain diethanolamine and dodecyl triethoxy silane, the finally prepared catalyst was labeled as DC-1. The properties of the catalyst were shown in Table 1.

Comparative Example 2

(1) Preparation of the Hydrocracking Catalyst Carrier

The preparation was carried out in the same manner as in the step (1) of the Example 5, except that the microcrystalline cellulose was not added, and the SAPO-34 molecular sieves were replaced with the same weight of Y molecular sieve, i.e., the added amount of Y molecular sieves was 34 g, so as to obtain a carrier DZ2.

(2) Preparation of the Catalyst

The preparation was performed in the same manner as in the step (2) of the Example 5, except that the carrier Z5 was replaced with the aforementioned carrier DZ2, the finally prepared catalyst was labeled as DC-2. The properties of the catalyst were shown in Table 1.

Comparative Example 3

(1) Preparation of Hydrocracking Catalyst Carrier

The preparation was carried out in the same manner as in the step (1) of the Example 5, except that the microcrystalline cellulose was not added, and the SAPO-34 molecular sieves were replaced with the same weight of Y molecular sieve, i.e., the added amount of Y molecular sieves was 34 g, so as to obtain a carrier DZ3.

(2) Preparation of the Catalyst

The preparation was performed in the same manner as in the step (2) of the Example 5, except that the carrier Z5 was replaced with the aforementioned carrier DZ3, the finally prepared catalyst was labeled as DC-3. The properties of the catalyst were shown in Table 1.

Comparative Example 4

(1) Preparation of the Hydrocracking Catalyst Carrier

The preparation was carried out in the same manner as in the step (1) of the Example 5, except that the microcrystalline cellulose was not added, and the SAPO-34 molecular sieves were replaced with the same weight of SAPO-11 molecular sieves (the molar ratio of $SiO_2/Al_2O_3$ was 0.3, the specific surface area was 735 $m^2/g$, and the total pore volume was 0.52 mL/g), so as to obtain a carrier DZ4.

(2) Preparation of the Catalyst

The preparation was performed in the same manner as in the step (2) of the Example 5, except that the carrier Z5 was replaced with the aforementioned carrier DZ4, the finally prepared catalyst was labeled as DC-4. The properties of the catalyst were shown in Table 1.

Example 8

(1) Preparation of the Hydrocracking Catalyst Carrier

The preparation was carried out in the same manner as in the step (1) of the Example 5, except that the pore volume of the secondary pores of the Y molecular sieves having a pore diameter of 1.7-nm accounted for 50% of the total pore volume, so as to obtain a carrier Z8.

(2) Preparation of the Catalyst

The preparation was performed in the same manner as in the step (2) of the Example 5, except that the carrier Z5 was replaced with the aforementioned carrier Z8, the finally prepared catalyst was labeled as C-8. The properties of the catalyst were shown in Table 1.

TABLE 1

Physicochemical properties of the catalysts

| Items | C-1 | C-2 | C-3 | C-4 | C-5 | DC-1 | DC-2 | DC-3 |
|---|---|---|---|---|---|---|---|---|
| Y molecular sieve, wt % | 19 | 25 | 24 | 24.3 | 21.7 | 19 | 28 | — |
| SAPO-34, wt % | 7 | 6 | 6.8 | 7.4 | 7.8 | 7.7 | — | 7.0 |

TABLE 1-continued

Physicochemical properties of the catalysts

| SiO$_2$, % | 1.8 | 2.2 | 2.5 | 1.6 | 2.8 | — | — | |
|---|---|---|---|---|---|---|---|---|
| MoO$_3$, wt % | 21.2 | 20.0 | 21.1 | 21.5 | 21.0 | 21.1 | 21.6 | 21.3 |
| NiO, wt % | 5.9 | 6.0 | 6.1 | 6.0 | 6.1 | 6.2 | 6.0 | 6.1 |
| P, wt % | 1.35 | 1.42 | 1.38 | 1.36 | 1.43 | 1.41 | 1.40 | 1.35 |
| Specific surface area, m$^2$/g | 186 | 184 | 193 | 185 | 190 | 182 | 181 | 192 |
| Pore volume, ml/g | 0.37 | 0.39 | 0.38 | 0.36 | 0.37 | 0.32 | 0.31 | 0.34 |
| Pore distribution, 4-10 nm | 85 | 83 | 81 | 79 | 83 | 75 | 77 | 70 |

| Items | C-5 | C-6 | C-7 | C-8 | DC-4 |
|---|---|---|---|---|---|
| Y molecular sieve content, wt % | 21.7 | 21.7 | 24.3 | 21.7 | 21.7 |
| SAPO-34 content, wt % | 7.8 | 7.8 | 7.4 | 7.8 | 0 |
| SiO$_2$ content, % | 2.8 | 2.8 | 1.6 | 2.8 | 2.8 |
| MoO$_3$, wt % | 21.0 | 21.2 | 21.8 | 22.0 | 21.6 |
| NiO, wt % | 6.1 | 6.1 | 6.0 | 6.1 | 6.1 |
| P, wt % | 1.43 | 1.38 | 1.37 | 1.43 | 1.43 |
| Specific surface area, m$^2$/g | 190 | 189 | 185 | 188 | 185 |
| Pore volume, ml/g | 0.37 | 0.37 | 0.36 | 0.38 | 0.38 |
| Pore distribution, 4-10 nm | 80 | C-6 | C-7 | 85 | 84 |

Note:
the SiO$_2$ content in Table 1 was the amount of silica loaded by the carrier, and was calculated according to the feeding amount of silane.

The catalysts obtained in the above examples and comparative examples were subjected to activity evaluation tests. The test was performed in a 200 m$^1$ small-scale test device using an one-stage process with connection in series (i.e. hydrofining and hydrocracking were processed in series), the hydrofining catalyst comprising: 23.3 wt % of MoO$_3$, 3.7 wt % of NiO, 1.38 wt % of phosphorus (P), and the balance was alumina carrier. The properties of the feedstock oil in use were shown in Table 2, and the operating conditions were as follows: the reactor inlet pressure was 14.7 MPa, the volume ratio of hydrogen-oil at the reactor inlet was 1200:1, the liquid hourly volume space velocity at the refining stage was 1.0 h$^{-1}$, the average reaction temperature was 375° C.; the liquid hourly volume space velocity at the cracking stage was 1.4 h$^{-1}$, the average reaction temperature was 383° C., and the catalyst activity results were shown in Table 3.

TABLE 2

Properties of the feedstock oil

| Feedstock oil | Iran VGO |
|---|---|
| Density | 0.893 |
| Distillation range, ° C. | 310-552 |
| Freezing point, ° C. | 29 |
| Aromatic hydrocarbons, wt % | 38.2 |
| BMCI value | 45.7 |

TABLE 3

Evaluation results of catalysts

| Catalyst number | C-1 | C-2 | C-3 | C-4 | C-5 | DC-1 | DC-2 | DC-3 |
|---|---|---|---|---|---|---|---|---|
| Heavy naphtha (82-132° C.) yield, % | 8.5 | 9.1 | 9.6 | 8.8 | 8.7 | 8.1 | 7.6 | 5.2 |
| Potential aromatic hydrocarbon content, wt % | 61.5 | 61.6 | 62.5 | 61.8 | 65.3 | 62.5 | 59.2 | 43.6 |
| Jet fuel (132-282° C.) yield, % | 40.2 | 40.3 | 39.8 | 38.9 | 39.2 | 32.7 | 30.5 | 20.2 |
| Smoke point, mm | 26 | 25 | 25 | 25 | 27 | 23 | 21 | 19 |
| Diesel oil (282-370° C.) yield, % | 18.5 | 17.6 | 17.9 | 18.3 | 18.1 | 20.3 | 21.5 | 15.3 |
| Cetane number | 78.2 | 76.5 | 73.2 | 70.9 | 73.5 | 74.1 | 58.6 | 49.8 |
| Tail oil (>370° C.) yield, % | 30.8 | 30.9 | 31.7 | 32.2 | 31.9 | 35.8 | 36.5 | 58.5 |
| BMCI value | 11.5 | 11.2 | 11.7 | 11.1 | 11.5 | 12.8 | 13.6 | 26.8 |

| Catalyst number | C-5 | C-6 | C-7 | C-8 | DC-4 |
|---|---|---|---|---|---|
| Heavy naphtha (82-132° C.) yield, % | 8.7 | 8.3 | 9.1 | 8.5 | 6.5 |
| Potential aromatic hydrocarbon content, wt % | 65.3 | 61.4 | 62.1 | 62.6 | 58.6 |
| Jet fuel (132-282° C.) yield, % | 39.2 | 37.5 | 35.8 | 33.8 | 30.2 |
| Smoke point, mm | 27 | 25 | 24 | 25 | 23 |
| Diesel oil (282-370° C.) yield, % | 18.1 | 17.3 | 18.2 | 17.9 | 16.2 |
| Cetane number | 73.5 | 70.5 | 71.2 | 72.1 | 55.8 |
| Tail oil (>370° C.) yield, % | 31.9 | 33.5 | 32.6 | 30.5 | 45.2 |
| BMCI value | 11.5 | 11.8 | 11.7 | 11.6 | 13.5 |

The evaluation results in Table 3 demonstrate that the catalysts of the present disclosure have the characteristics such as high jet fuel yield, excellent product properties, and low BMCI value of tail oil.

The invention claimed is:

1. A hydrocracking catalyst comprising a carrier, silica and an active ingredient,
   wherein:
   the silica and the active ingredient are loaded on the carrier,
   the carrier comprises one or more Y molecular sieves and SAPO-34 molecular sieve, and, based on a weight of the carrier, a content of the one or more Y molecular sieves is within a range of 2-35 wt %, and a content of the SAPO-34 molecular sieve is within a range of 2-25 wt %;
   the active ingredient comprises VIB group metal and/or VIII group metal;
   based on a weight of the catalyst, a content of silica loaded on the carrier is within a range of 0.5-5 wt %;
   a content of the VIB group metal in terms of oxide is within a range of 10-25 wt %; and
   a content of the VIII group metal in terms of oxide is within a range of 4-10 wt %.

2. The catalyst of claim 1, wherein the silica and the active ingredient are jointly distributed on an outer surface of the carrier and an inner surface of a pore channel of the carrier.

3. The catalyst of claim 1, wherein the one or more Y molecular sieves has a molar ratio of SiO$_2$/Al$_2$O$_3$ within a range of 25-150, a specific surface area within a range of 550-1,000 m$^2$/g, and a total pore volume within a range of 0.3-0.6 mL/g.

4. The catalyst of claim 1, wherein the SAPO-34 molecular sieve has a molar ratio of $SiO_2/Al_2O_3$ within a range of 0.05-0.5, a specific surface area within a range of 200-800 $m^2/g$, and a total pore volume within a range of 0.3-0.6 mL/g.

5. The catalyst of claim 1, wherein the carrier further comprises a binder, and a content of the binder in the carrier is within a range of 15-85 wt %.

6. The catalyst of claim 1, wherein the catalyst has a specific surface area within a range of 120-500 $m^2/g$, a pore volume within a range of 0.30-0.65 mL/g, and a pore volume of pores having a diameter of 4-10 nm accounts for 65-95% of a total pore volume of the catalyst.

7. A preparation method of a hydrocracking catalyst, comprising:
   (1) subjecting a material comprising one or more Y molecular sieves and SAPO-34 molecular sieve to molding, drying and calcinating to obtain a carrier;
   (2) introducing silane and an active ingredient into the carrier prepared in the step (1) to form a mixture, wherein the active ingredient comprises VIB group metal and/or VIII group metal; and
   (3) drying and calcinating the mixture obtained in the step (2).

8. The method of claim 7, wherein the material in step (1) further comprises a binder or a precursor thereof, or the binder or the precursor thereof is mixed with the one or more Y molecular sieves and SAPO-34 molecular sieve during molding.

9. The method of claim 7, wherein the material in the step (1) further comprises microcrystalline cellulose, and a content of the microcrystalline cellulose in the material is within a range of 0.2-6 wt %.

10. The method of claim 7, wherein the drying conditions in the step (1) comprise a drying temperature within a range of 60-180° C., and a drying time within a range of 0.5-20 hours; and
    the calcinating conditions in the step (1) comprise a calcinating temperature within a range of 350-750° C., and a calcinating time within a range of 0.5-20 hours.

11. The method of claim 7, wherein the one or more Y molecular sieves has a molar ratio of $SiO_2/Al_2O_3$ within a range of 25-150, a specific surface area within a range of 550-1,000 $m^2/g$, and a total pore volume within a range of 0.3-0.6 mL/g; and
    the SAPO-34 molecular sieve has a molar ratio of $SiO_2/Al_2O_3$ within a range of 0.05-0.5, a specific surface area within a range of 200-800 $m^2/g$, and a total pore volume within a range of 0.3-0.6 mL/g.

12. The method of claim 7, wherein the silane in step (2) is one or more selected from the group consisting of aminosilane, alkylsilane, and sulfur-containing silane.

13. The method of claim 7, wherein in the step (2), the active ingredient and the silane are introduced simultaneously or separately.

14. The method of claim 13, wherein the active ingredient or the silane is introduced by impregnation in an aqueous solution.

15. The method of claim 7, wherein in step (3), the drying temperature is within a range of 60-200° C., and the drying time is within a range of 0.5-20 hours; the calcinating temperature is within a range of 300-500° C., and the calcinating time is within a range of 0.5-20 hours.

16. A process for producing jet fuel, comprising contacting a heavy feedstock oil under hydrocracking conditions with the hydrocracking catalyst in claim 1.

17. The process of claim 16, wherein the hydrocracking conditions comprise a reaction temperature within a range of 340-430° C., a hydrogen partial pressure within a range of 5-20 Mpa, a hydrogen-oil volume ratio within a range of 500-2000:1, and a liquid hourly space velocity within a range of 0.5-1.8 $h^{-1}$.

18. The catalyst of claim 1, wherein:
    based on the weight of the carrier, the content of the one or more Y molecular sieves is within a range of 8-25 wt %, and the content of the SAPO-34 molecular sieve is within a range of 2-8 wt %;
    the VIB group metal is molybdenum (Mo) and/or tungsten (W), the VIII group metal is cobalt (Co) and/or nickel (Ni); and,
    based on the weight of the catalyst, the content of silica loaded on the carrier is within a range of 1-4 wt %, the content of the VIB group metal in terms of oxide is within a range of 15-20 wt %, and the content of the VIII group metal in terms of oxide is within a range of 5-8 wt %.

19. The catalyst of claim 18, wherein based on the weight of the carrier, the content of the one or more Y molecular sieves is within a range of 10-20 wt %, and the content of the SAPO-34 molecular sieve is within a range of 2.5-6 wt %; and based on the weight of the catalyst, the content of silica loaded on the carrier is within a range of 1.5-3 wt %.

20. The catalyst of claim 6, wherein the catalyst has a specific surface area within a range of 170-300 $m^2/g$, a pore volume within a range of 0.35-0.60 mL/g and a pore volume of pores having a diameter of 4-10 nm accounts for 70-90% of a total pore volume of the catalyst.

* * * * *